United States Patent [19]

Woog

[11] Patent Number: 4,662,613
[45] Date of Patent: May 5, 1987

[54] REUSABLE PRECIOUS METAL RECOVERY CARTRIDGE

[76] Inventor: Manfred J. Woog, 1960 B. St., Craig, Colo. 81625

[21] Appl. No.: 504,142

[22] Filed: Jun. 14, 1983

[51] Int. Cl.[4] .................. C22B 5/00; C22B 11/04
[52] U.S. Cl. .................. 266/170; 75/109; 75/118 R; 75/118 P; 204/109; 210/512.1
[58] Field of Search .................. 266/170; 75/108–109, 75/118 R, 118 P; 204/109; 210/512.1

[56] References Cited

U.S. PATENT DOCUMENTS

| | | | |
|---|---|---|---|
| 1,617,353 | 2/1925 | Snelling | 75/109 |
| 2,068,263 | 2/1935 | Burhans | 210/131 |
| 2,214,765 | 9/1938 | Holzwarth | 75/109 |
| 2,905,323 | 2/1956 | Megesi | 210/130 |
| 3,261,473 | 2/1964 | Riede | 210/282 |
| 3,327,859 | 12/1963 | Pall | 210/266 |
| 3,792,845 | 2/1974 | Larson et al. | 266/170 |
| 4,201,827 | 5/1980 | Heitkamp | 428/283 |
| 4,213,600 | 7/1980 | Thompson, Jr. | 266/170 |
| 4,227,681 | 10/1980 | Golben | 266/170 |
| 4,240,617 | 12/1980 | MacKay | 266/170 |
| 4,250,172 | 2/1981 | Mutzenberg et al. | 428/234 |
| 4,276,171 | 6/1981 | Jackson | 210/437 |
| 4,284,500 | 8/1981 | Keck | 209/250 |
| 4,325,732 | 4/1982 | Woog | 75/109 |
| 4,331,473 | 5/1982 | King, Jr. | 266/170 |

Primary Examiner—John Doll
Assistant Examiner—Robert L. Stoll
Attorney, Agent, or Firm—Arnold B. Silverman

[57] ABSTRACT

A reusable cartridge for extracting precious metal from solutions containing such metal by means of a replacement reaction is disclosed. A dispersion means distributes incoming solution uniformly through a cylindrical housing having a spiral rolled exchange mass therein. The mass contains fine particles of replacement metal of higher electromotive force than the metal to be recovered. Spacer rings are provided to secure the spiral mass in position, to aid in directing the flow of solutions uniformly through the exchange mass and to prevent overly large flow paths from developing between spiral layers. A removable outlet end cap allows access to the interior of the cartridge for removal and replacement of the exchange mass thereby making the cartridge readily reusable.

11 Claims, 7 Drawing Figures

REUSABLE PRECIOUS METAL RECOVERY CARTRIDGE

BACKGROUND OF THE INVENTION

1. Field of the Invention

This invention relates to reusable cartridge means for extracting precious metals from a solution containing such metal by means of a replacement reaction and, more specifically, it relates to such cartridge means which provide improved flow characteristics and ready access to the cartridge interior.

2. Description of the Prior Art

It is often desirable to recover precious metals from solutions containing such metals. For example, silver may be recovered from certain photographic solutions such as fixer solutions.

It is known that recovery of precious metals from a solution can be achieved by utilizing a replacement reaction. A replacement reaction occurs when a solution containing a precious metal is placed into contact with a replacement metal which is higher in the electromotive force series. The resulting chemical reaction causes the precious metal to be reduced and come out of solution and be recoverable either as a precipitate or as a plating on the replacement metal.

A number of devices and methods have been used in the past to place the solution in contact with the replacement metal. The method which is generally believed to provide the most complete replacement reaction is batch processing in which powdered replacement metal is placed directly into the solution and agitated. That method, however, is time consuming and considerable technical skill is required to determine the approximate silver or other precious metal content of the solution in order to ascertain the proper amount of replacement metal which must be added.

It has been known to employ continuous flow methods which pass a solution over a matrix of replacement metal, such as steel wool, metal gratings or even cylindrical rolls of window screening contained within a housing. Those methods while more convenient to use than batch processing often do not provide a complete reaction because there is either not sufficient surface area of replacement metal to contact all of the solution or because the solution develops passageways through the matrix which allow the solution to avoid contact with the replacement metal.

Another known continuous flow device utilizes metal powder dispersed on a porous inert medium such as alumina. Although the powdered metal initially presents a large surface area for a high reaction rate while deriving its support structure from the alumina, clogging frequently occurs as use continues and sometimes causes the solution to develop passageways through the structure which allow the solution to bypass contact with the metal.

In my earlier U.S. Pat. No. 4,325,732, I provide a solution to the above-mentioned clogging problem by employing a cartridge having inlet and outlet means and a spirally rolled exchange mass positioned therebetween. The exchange mass may be a flexible, resilient, fibrous material forming a self-supporting matrix which is non-reactive to the solutions with which it is intended to be used and has finely divided particles of replacement metal dispersed within the mass. As the exchange mass is capable of flexing, clogging within the mass is resisted. Although my earlier patented cartridge provides an effective metal recovery system, refinements thereto for providing even better performance would be desirable.

SUMMARY OF THE INVENTION

The present invention relates to improvements in a precious metal recovery cartridge of the type described in U.S. Pat. No. 4,325,732 which provide a more uniform flow of solution through a spiral exchange mass, better secures the exchange mass within a housing in an appropriately compressed spiral configuration and allows free access to the cartridge interior so that the exchange mass may be replaced and the cartridge reused.

In my earlier patented system I provided an apparatus for recovery of precious metal by reaction with a replacement metal of higher electromotive force. That apparatus comprised a cylindrical housing having inlet and outlet means at opposite ends thereof for receipt and discharge of solution initially containing a precious metal. An exchange mass formed of a resilient fibrous material was provided within the housing between the inlet and outlet means to allow flexing of the mass under fluid pressure to prevent clogging thereof by deposited precious metal. The exchange mass further included finely divided particles of the replacement metal carried at dispersed locations throughout the fibrous structure. For recovery of silver, an exchange mass formed of fiberglass material rolled into a spiral configuration was preferred. Particles of iron were dispersed therein on the various spiral layers. Inlet and outlet cavities were provided at opposite axial ends of the housing. Flow of recovery-metal bearing solution between the inlet and outlet means was provided substantially parallel to the longitudinal axis of the housing. Finally, for some applications, an optional filter mass was provided within the housing downstream from the exchange mass for filtering particulate matter.

In the present invention, a cylindrical housing is provided having at least one removable end closure or cap thereon to allow ready access to the exchange mass to permit replacement thereof and reuse of the housing. A removable end cap containing the outlet means and having an effective sealing means secured thereto to tightly seal the cap on the remaining portion of the cylindrical housing is preferred.

An improved inlet dispersion means is provided to direct a first portion of the incoming flow of recovery-metal bearing solution radially outwardly towards the outer cylindrical cap or housing wall and a second portion of the flow directly toward the exchange mass. The dispersion means provides a more uniform flow of solution throughout the cavity and generally increases efficiency of the cartridge.

In one embodiment, the dispersion member has a first conduit leg for receiving influent and at least two delivery legs for efficient introduction of influent into the exchange mass. These legs may be generally radially oriented with respect to the central axis of the housing. The dispersion member also preferably has a plurality of openings facing the exchange mass.

A plurality of concentric spacer rings preferably having transverse flow passageways therein are disposed within the outlet end of the housing and extend across the outlet cavity. These rings are provided to engage and secure the exchange mass in place and to resist separation of the spiral layers. This arrangement provides a more uniform flow through the housing even with a relatively strong flow current.

It is an object of the present invention to provide an improved cartridge means for recovering precious metal from solution while permitting ready access to the interior of the cartridge.

It is another object to provide such a cartridge means which is reusable.

It is yet another object to provide a cartridge means which provides an improved flow efficiency of metal-bearing solution through an exchange mass.

It is yet another object of the invention to provide a cartridge means which is economical to manufacture and use.

It is a further object to provide an improved cartridge means which accomplishes the above-mentioned objects without requiring substantial changes in the exchange mass or the general configuration of known cartridges.

These and other objects of the invention will be more fully understood from the following description of the invention, on reference to the illustrations appended thereto.

DESCRIPTION OF THE PREFERRED EMBODIMENTS

Figure 1:
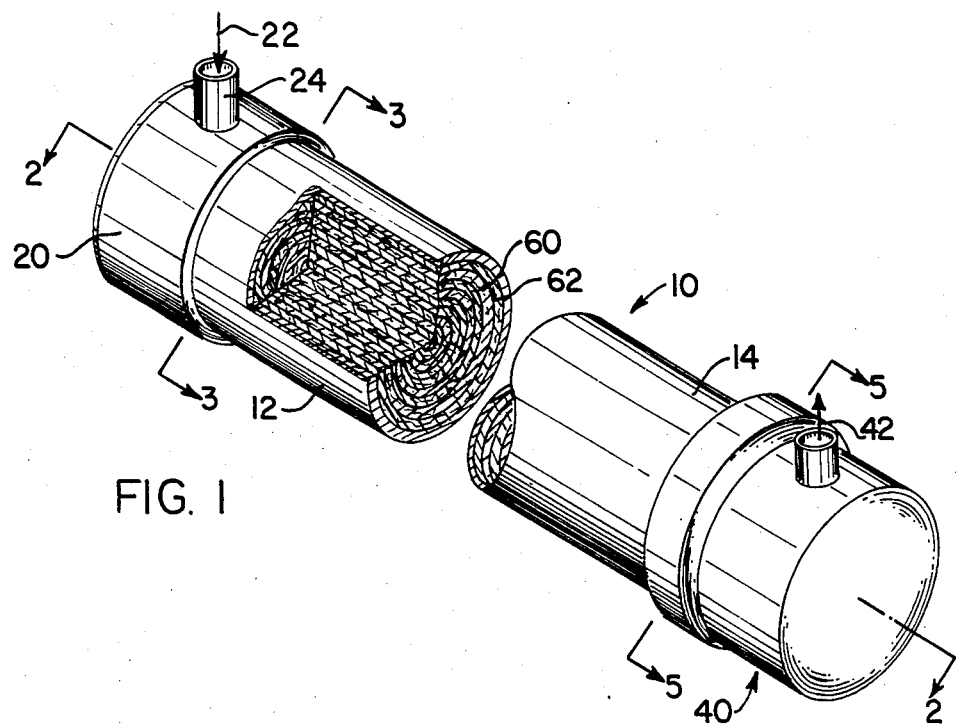
FIG. 1 is an isometric view of the metal recovery cartridge with a center portion broken away in order to show the exchange mass.
Figure 2:
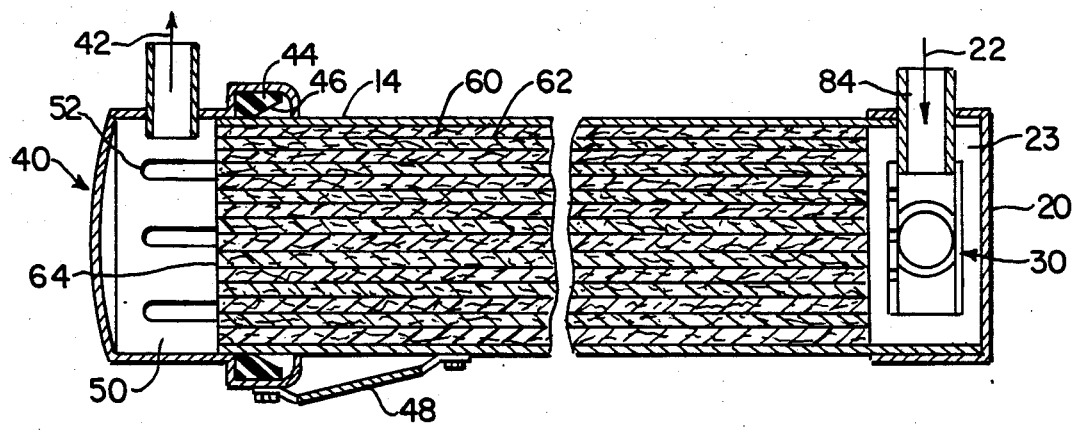
FIG. 2 is a cross-sectional view taken through plane 2—2 of FIG. 1.
Figure 3:
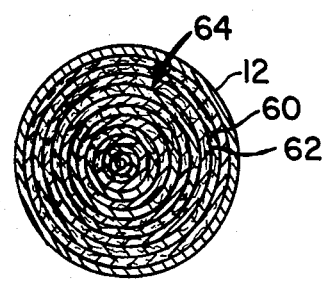
FIG. 3 is a cross-sectional view taken through plane 3—3 of FIG. 1.

Referring more specifically to FIGS. 1 through 5, a precious metal recovery cartridge 10 is shown. Hereinafter, a silver recovery cartridge will be described in detail, but it is to be understood that the present invention is not limited to the recovery of silver and by providing different replacement metals in the exchange mass various other precious metals can be recovered from solution.

The cartridge in the form shown has a generally cylindrical housing 12 constructed of any suitable material which is substantially inert to chemical reactions with silver ions and with the types of solutions which generally will be used in the cartridge. Polyvinylchloride pipe is among the preferred materials. Housing 12 is closed at the respective ends by inlet cap 20 and removable outlet cap 40. These caps may also be made from any suitable material such as polyvinylchloride, for example. Inlet cap 20 is preferably attached to the housing 12 by solvent welding to provide a leakproof seal and is provided with inlet means 22. Optionally, adhesive or any other suitable securement or sealing means may be employed. Outlet cap 40 is provided with outlet 42 and is preferably removably attached to housing 12 so that access to the interior of the housing is readily accomplished. Cap 40, in the form shown, is held in an engaging relationship with housing 12 by an annular sealing gasket member 44 and by at least one securing strap 48. Strap 48, in the form shown, is secured to cap 40 and housing 12 by screws. The inside surface 46 of gasket 44 is tapered so that the leading edge of the gasket can receive end portion 14 of housing 12 and seal the engaging interface between the cap 40 and housing 12 to resist leakage of the liquid being treated. For convenience of disclosure there is shown an annular ring gasket sealing member sealing against the housing exterior, but it is to be understood that any other suitable cap sealing means may be employed.

Secured within the housing between the inlet means 22 and outlet 42 a resilient exchange mass 60 is provided which carries particles of a replacement metal 62 higher in the electromotive force series than silver in order that a replacement reaction will occur when a solution having dissolved silver ions therein is passed through the mass 60. This reaction results in the precipitation of silver and retention thereof on the mass. An inlet manifold on cavity 23 is provided within the housing 12 immediately adjacent to inlet means 22 and an outlet manifold or cavity is provided adjacent to outlet 42.

Outlet 42 in the form shown is provided through an opening in the sidewall of cap 40 as by drilling and welding or otherwise securing an outlet pipe 42 therein. Similarly, after inlet cap 20 is secured to the housing 12, inlet means 22 are provided in cap 20 by providing an opening through the cap sidewall and pipe sidewall into the inlet cavity 23. An inlet pipe 24 is then inserted through the opening and secured in place. An inlet dispersion member 30 is then connected to the interior end of inlet pipe 24. Dispersion member 30 may be attached prior to placement of exchange mass 60 and outlet end cap 40.

Figure 4:
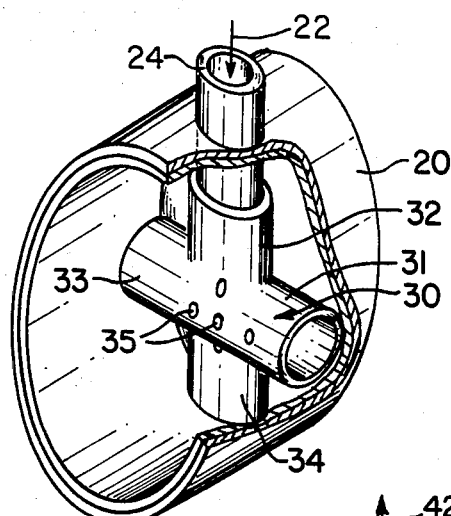
FIG. 4 is an isometric view of the inlet portion of the cartridge partially broken away to show the configuration of the inlet dispersion means.
Figure 5:
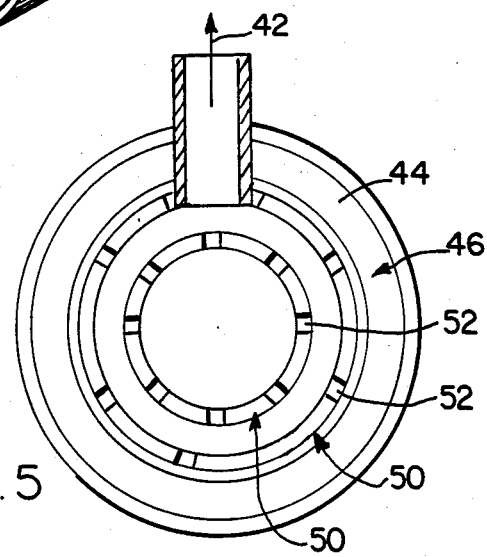
FIG. 5 is a cross-sectional view taken through plane 5—5 of FIG. 1.

Referring to FIG. 4, the inlet dispersion member 30 has a plurality of conduit legs 31, 32, 33, 34 in communication with each other and extending generally radially outwardly from and orthogonal to the axial center of inlet cavity 23. One of the outwardly extending legs 32 is secured to inlet pipe 24 in order to receive influent therefrom. The remaining tubes 32, 33 and 34 act to disperse a portion of the incoming flow of solution generally radially outwardly. As best shown in FIG. 4, at least one relatively small opening and preferably a plurality of openings 35 are provided in the surface of the dispersing member 30 facing the exchange mass in order to conduct a portion of the incoming solution flow directly into the spiral exchange mass 60 at desired locations across the inlet end surface 64 of the mass. By varying the number, length and diameter of radially extending conduit legs and the number, placement and diameter of small openings in such dispersing member, it is possible to direct desired portions of the incoming flow uniformly through the exchange mass thereby obtaining full benefit of the powdered metal dispersed within the spiral. The end result of providing uniform flow throughout the spiral exchange mass is to increase the overall efficiency of the recovery cartridge. It will be appreciated that while in the form illustrated one inlet conduit 32 and three outlet conduits 31, 33, 34 have been provided, different numbers may be employed if desired. Where four conduits are employed it is preferred that they be offset from the next adjacent conduit by about 80–100 degrees.

It is contemplated that many types of dispersion means could be developed to accomplish the task of providing a relatively uniform flow of solution through the entire cross-sectional area of the exchange mass 60. However, in order to have control of the flow, at least a portion of the flow should preferably be directed generally toward the exchange mass 60. It is, therefore, to be understood that the invention is not limited to the above-described preferred dispersion means. It is to be further understood that inlet and outlet means could be provided on the axial ends of the caps extending outwardly generally parallel or coaxial with longitudinal axis.

Figure 6:
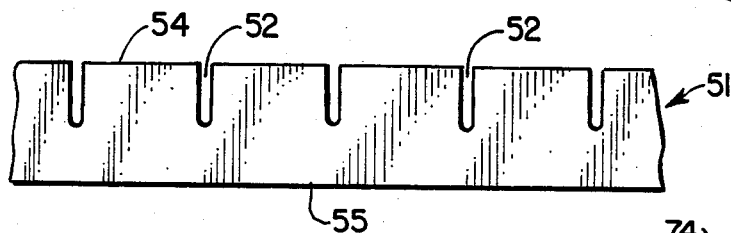
FIG. 6 is a top plan view of a segment of an unrolled spacer ring.

Efficiency may be further increased by providing a series of generally concentric spacer rings 50 in outlet cap 40. The rings 50 are preferably formed from flat strips 51 of any suitable material such as polyvinylchloride as shown in FIG. 6. Other means, such as molding the rings as a unit may be employed, if desired. Along one edge 54 of the strip 51, a plurality of transverse access openings or fluid passageways 52 are provided in order that the rings may provide additional control of the flow while permitting radial flow. The opposite edge 55 of strip 51 is preferably generally flat.

The ends of strips 51 of varying length are joined together to form rings 50 having various diameters. The flat edges 55 of these rings 50 may be secured to inner face 44 of end cap 40 and are arranged in concentric fashion. Alternatively, the rings 50 may be fixed in relative position by securement to each other. The spacer rings 50 are provided to perform the following functions. First, the most outer spacer ring 50 acts as a stop which prevents outlet cap member 40 from being pushed onto housing 12 beyond its desired position. Second, the interior spacer ring or rings 50 extend across the outlet cavity and engage the exchange mass 60 and aid in resisting longitudinal displacement of the entire mass. Third, the rings act to facilitate efficient flow through the cartridge. Finally, the interior rings engage the spiral end surface 64 of exchange mass 60 at varying concentric locations and thereby aid in keeping the individual spiral layers from separating even under a relatively strong flow or one which is not uniform across the cross-sectional area of the mass.

Figure 7:
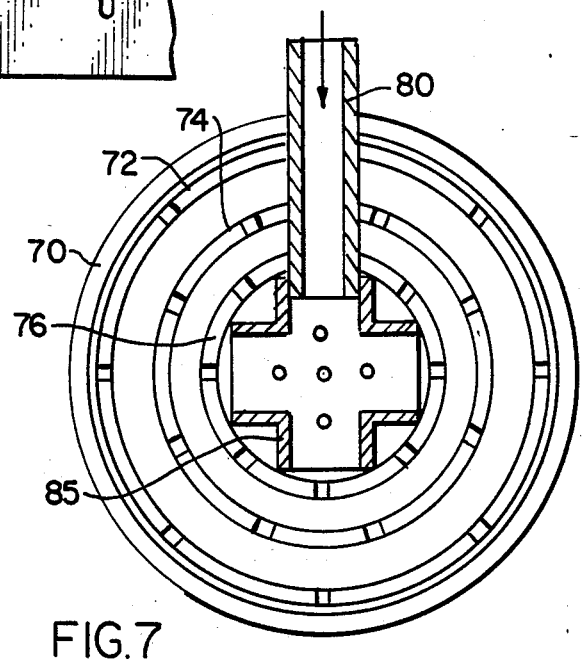
FIG. 7 is a cross-sectional view of an inlet dispersion means and concentric spacer rings of a cartridge of larger diameter than that shown in the preceding figures.

It is also within the scope of the present invention to provide spacer rings substantially as described above on the inlet cap 20 as well as the outlet cap 40. Providing spacers on both end caps is particularly desirable where a housing of relatively large diameter is utilized. In FIG. 7, a cross-sectional view of a housing inlet cap 70 is shown. One outer ring 72 and two inner rings 74 and 76 ar provided. In this case, rings 72, 74 and 76 must have openings to receive inlet pipe 80. A dispersion member 85 is provided within the space defined by inner most spacer ring 76. When spacer rings are provided on an inlet cap, the size and placement of fluid passageways on the rings are considered as an integral part of the inlet means. These are designed to provide a relatively uniform flow through the exchange mass.

In operation, a solution containing silver ions enters the cartridge 10 through inlet pipe 24 and is dispersed both radially outwardly and directly toward exchange mass 60 by dispersion member 30 and by spacer rings. A substantially uniform flow of silver containing solution is thereby forced by fluid pressure to pass through a spirally wound exchange mass 60. The fluid passes through the exchange mass 60 in flow paths substantially parallel to the longitudinal axis of the housing.

The exchange mass 60 for recovery of silver is preferably formed from a layer of fiberglass having particles of iron sprinkled thereon which is rolled into a spiral. As the solution passes over the iron particles a replacement reaction occurs and silver precipitates from the solution. Although exchange and recovery of silver take place at almost identical locations, clogging is resisted by resilience of the mass. The mass can flex and compress or expand in a sponge-like manner when silver deposits cause too great a fluid pressure drop across the mass, as when particles have clogged flow paths in the mass. After the solution passes through the mass and the silver is deposited therein the substantially silver-free solution exits the cartridge 10 through outlet 42. After the desired amount of use, the solution is withdrawn from the cartridge, outlet end cover 40 is recovered and exchange mass 60 is replaced. Cover 40 is reattached and the cartridge is again ready for use. The silver can be collected from the exchange mass by smelting or other suitable means. The silica of the fiberglass serves as a flux for separating the silver from other elements that may be deposited in the exchange mass.

It will be appreciated, therefore, that the present invention provides an improved economic precious metal recovery cartridge which effects efficient flow of the precious metal containing fluid therethrough and is reuseable.

Whereas particular embodiments of the invention have been described above for purposes of illustration, it will be appreciated by those skilled in the art that numerous variations of the details may be made without departing from the invention as described in the appended claims.

I claim:

1. Apparatus for the recovery of metal from a recovery-metal bearing solution by reaction with a replacement metal of higher electromotive force wherein a cylindrical housing has spaced-apart inlet and outlet means, an exchange mass is disposed within said housing between said inlet and outlet means, said exchange mass comprises a resilient fibrous support structure and a plurality of finely divided particles of replacement metal carried in dispersed relationship on said support structure said apparatus has an inlet cavity adjacent to said inlet means and an outlet cavity adjacent to said outlet means, and said support structure is capable of resilient flexing in response to obstruction of said flow path wherein the improvement comprises:
   at least one removable cap secured to the housing at one axial end thereof to allow access to the interior of the housing, and
   said inlet means includes an inlet pipe in communication with said inlet cavity and a dispersion member in communication with said inlet pipe, whereby said dispersion member directs a first portion of the solution entering said inlet means in a generally radially outward direction and a second portion of the solution generally directly toward the exchange mass.

2. The apparatus according to claim 1 wherein said removable cap is provided with sealing means to effect a seal between said cap and said housing.

3. The apparatus according to claim 2 wherein said sealing means is an annular gasket member.

4. The apparatus of claim 1 wherein said dispersion member has an inlet conduit leg for receiving said solution from said inlet pipe and at least two outlet legs for directing said solution generally radially outwardly toward said cap or housing lateral walls.

5. The apparatus of claim 4 wherein said dispersion member has three said outlet conduit legs whose axes intersect generally at the center of said inlet cavity.

6. The apparatus of claim 5 wherein a number of openings are provided in a wall of said dispersion member generally facing said exchange mass, whereby a portion of said solution entering said inlet pipe will be directed generally radially outwardly said outlet conduits and another portion of said solution will be directed toward said exchange mass through said openings.

7. The apparatus of claim 6 wherein said conduit legs are offset from the next adjacent conduit leg by about 80 to 100 degrees.

8. The apparatus according to claim 1 wherein
a plurality of concentric spacer rings are secured within said outlet cavity,
said rings engage said exchange mass and aid in securing said mass in a desired spiral configuration, and
each of said rings have at least one passageway therein to facilitate flow of said solution through the outlet cavity to said outlet means.

9. An apparatus according to claim 8 wherein
a plurality of concentric spacer rings are secured within said inlet cavity,
said rings provided on said inlet end being in engagement with the exchange mass, and
said inlet rings each having at least one transverse passageway therein to facilitate a substantially uniform flow of said solution from the inlet means to substantially the entire area of an end of the exchange mass facing said inlet cavity.

10. An apparatus according to claim 9 wherein each of said spacer rings has a plurality of said passageways.

11. An apparatus according to claim 1 wherein said dispersion member facilitates a substantially uniform flow of solution from the inlet means to substantially the entire area of an end of the exchange mass facing said inlet cavity.

* * * * *

UNITED STATES PATENT AND TRADEMARK OFFICE
CERTIFICATE OF CORRECTION

PATENT NO. : 4,662,613

DATED : May 5, 1987

INVENTOR(S) : MANFRED J. WOOG

It is certified that error appears in the above-identified patent and that said Letters Patent is hereby corrected as shown below:

Column 1, line 14, --highly-- should be inserted before "desirable".

Column 3, line 23, "thereto" should be --hereto--.

Column 5, line 52, "ar" should read --are--.

Column 6, line 16, "recovered" should be --removed--.

Claim 6, column 7, line 10, --through-- should be inserted after "outwardly".

Signed and Sealed this

Tenth Day of November, 1987

Attest:

DONALD J. QUIGG

Attesting Officer     Commissioner of Patents and Trademarks